United States Patent

Inamdar

[15] 3,696,367
[45] Oct. 3, 1972

[54] GROUND FAULT DETECTION CIRCUIT

[72] Inventor: Sayed-Ibrahim S. Inamdar, Newark, Calif.

[73] Assignee: Bechtel International Corporation, San Francisco, Calif.

[22] Filed: April 21, 1971

[21] Appl. No.: 135,915

[52] U.S. Cl. ..................................340/255, 324/51
[51] Int. Cl. ...........................................G01r 31/02
[58] Field of Search ....340/255; 324/51, 266; 317/18

[56] References Cited

UNITED STATES PATENTS 2,585,734    2/1952    Bucher......................340/255

OTHER PUBLICATIONS

Electronic Engineering; A Combined Voltage and Earth Indicator for D.C. Supplies by G. T. Edwards; Vol. 37, No. 443; pages 34– 35.

Primary Examiner—John W. Caldwell
Assistant Examiner—D. K. Myer
Attorney—Eckhoff, Hoppe, Slick, Mitchell and Anderson

[57] ABSTRACT

A ground fault detection circuit for use with dual voltage battery systems, comprising first and second ground connected circuits which are alternatively energized depending on the location of a ground fault in any one of three lines connected to the system, and including means for visually observing the extent of such ground faults.

10 Claims, 1 Drawing Figure

PATENTED OCT 3 1972 3,696,367
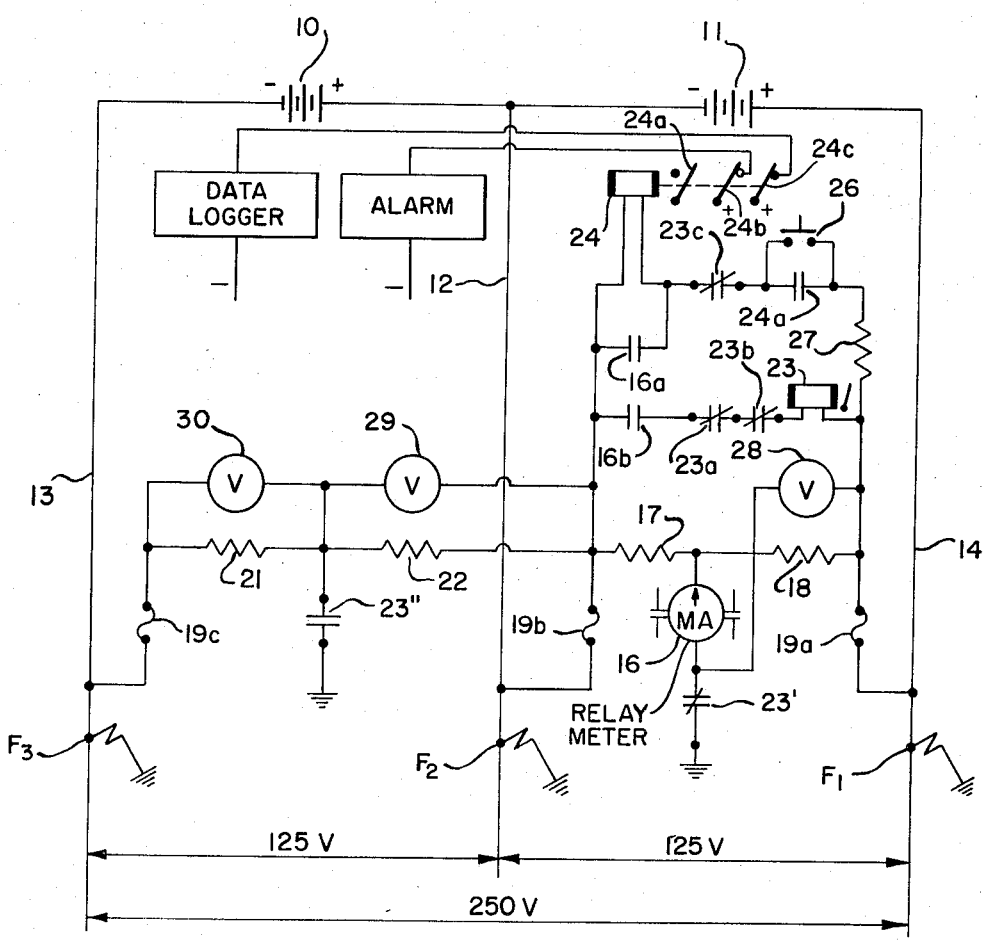
SAYED IBRAHIM S. INAMDAR
INVENTOR.
BY Eckhoff, Hoppe, Slick
Mitchell and Anderson
ATTORNEYS

GROUND FAULT DETECTION CIRCUIT

This invention relates generally to ground fault detection circuits and more particularly to circuits for dual voltage battery systems.

Ground fault detection circuits are commonly employed in both single and multiple voltage battery systems. Conventional circuits employed in single voltage systems are usually quite simple and are mostly reliable. However, such circuits are unsatisfactory for use on dual voltage battery systems in which a fault may occur in any one of three lines. Detection circuits which are known and available for use in systems having more than one voltage supply are regarded as being quite unsatisfactory, particularly if they require one or several power circuits to be opened in order to locate a ground fault. The use of such circuits have caused plant personnel, in some instances, to take undesirable risks and wait for light load periods before opening the power circuits to locate a fault. In the meantime, other ground faults may occur, causing a protective fuse or breaker to open, interrupting vital plant controls, or even conceivably destroying the battery installation by fire or explosion.

It is, therefore, a principal object of this invention to provide a ground fault detection circuit for dual voltage battery systems that allows an immediate identification of a ground fault in any one of three lines connected to the system, and without interrupting power on unaffected circuits required for service.

It is another object of the invention to provide ground fault detection circuits of the kind described wherein a ground fault in any one of three lines connected to the system will immediately signal an alarm and indicate which of the three lines contains the ground fault.

Another object is to provide a ground fault detection circuit of the kind described and an alarm system which must be manually reset to avoid neglect or oversights in repairing ground faults.

It is still a further object of the invention to provide a simple and inexpensive circuit for detecting ground faults in any one of three lines of a dual voltage battery system.

Other objects of this invention will become apparent in view of the following detailed description and the accompanying drawings of a typical dual voltage battery system.

In the drawings forming a part of this application, there is shown a preferred embodiment of this invention in a circuit for detecting ground faults in a dual voltage battery system.

Referring to the drawing, there is shown a pair of batteries 10 and 11 connected to a common bus line 12, the negative bus of battery 10 connecting to line 13 and the positive bus of battery 11 connecting to line 14. Each battery, when fully charged, provides a d.c. voltage of 125 volts, and together they provide a 250 voltage supply. This is a commonly used dual voltage battery system to which this invention is a ground fault detection circuit may be applied.

The ground fault detection circuit more particularly comprises a first ground connected circuit including a set of normally closed contacts 23' and means for detecting a current flow to or from ground. A preferred form of detecting means is a milliameter relay having its coil connected between contacts 23' and a pair of substantially equal resistances 17 and 18, which connect to lines 12 and 14, respectively, through a pair of safety fuses 19a and 19b.

A flow of current through the coil of milliameter 16 will close one of two sets of contacts 16a or 16b. The flow of current from ground closes contacts 16a in an alarm circuit, whereas a reverse or negative current flow closes contacts 16b in a lock-out circuit which is to be further described.

A second ground connected circuit comprises a set of normally open contacts 23 connected between ground and a pair of substantially equal resistances 21 and 22, which connect to lines 13 and 12, respectively, through safety fuses 19c and 19b.

Contacts 23' of the first ground connected circuit and contacts 23 of the second circuit are simultaneously operated to opposite conditions by a relay 23 having its coil momentarily energized whenever contacts 16b are closed. Relay 23 serves as a means responsive to momentary current flow through the first ground connected circuit for opening the first circuit and closing the second circuit. A preferred form of relay, known as a lock-out relay, also contains and operates a pair of contacts 23a and 23b for interrupting the current flow through the relay coil. Thus, the relay coil is "locked out" and cannot be energized until manually reset, and until such time contacts 23', 23a and 23b remain open, and contacts 23 remain closed. Typical lock-out relays of this kind are manufactured by Westinghouse and General Electric.

The alarm circuit which includes contacts 16a also comprises an alarm relay 24 disposed in parallel with contacts 16b and in series with a set of normally closed contacts 23c, and energizing-holding circuit comprising a push button contact 26 and holding contacts 24a, and a resistance load 27. Contacts 23c are operated by the coil of relay 23 and are opened when contacts 16b are closed. Once opened, contacts 23c remain open until relay 23 is manually reset.

Alarm relay 24, while energized, opens a pair of contacts 24b and 24c, which in turn control an audible alarm and a data logger. The use and operation of these devices is well known and are conventionally employed in other ground fault detection circuits.

The ground fault detection circuit of this invention also includes a plurality of means for indicating voltage drops between ground and lines 12, 13 and 14, respectively. Such means comprise a plurality of voltmeters, one such voltmeter 28 indicates a voltage drop through the normally closed contacts 23' between ground and line 14. A second voltmeter 29 is used to indicate a voltage drop through the normally open contacts 23 between ground and line 12, while a third voltmeter 30 shows a voltage drop through the normally open contacts 23 between ground and line 13.

A typical operation of the ground fault detection circuit is as follows:

The circuit is initially conditioned by manually setting or resetting lock-out relay 23 and operating push button 26 to energize the alarm circuit including relay 24. If we now assume that a fault $F_1$ appears in line 14, there will be a flow of current through the coil of milliameter 16 in the first ground connected circuit sufficient to close contacts 16a, thereby shorting alarm relay 24, opening its holding circuit through contacts 24a. Contacts 24b and 24c will then close, setting off an audible alarm and energizing the data logger. It will also be apparent that the voltage shown on voltmeter 28 will drop toward zero while the voltages on voltmeter 29 and 30 remain about the same. This condition or indication shows that a fault exists in line 14.

Assuming as a second condition of operation that a ground fault should occur in line 12, as at point $F_2$, there would be an initial flow of current through the first ground connected circuit including the coil of milliameter 16 and normally closed contacts 23'. But the current flow would be in a direction opposite to that caused by a fault in line 14. The reverse flow of current now closes contacts 16b rather than contacts 16a. Simultaneously, the coil of lock-out relay 23 will be momentarily energized, opening contacts 23' and 23c and closing contacts 23 of the second ground connected circuit. As previously explained, contacts 23a and 23b will also open and deenergize the coil of relay 23; however, because of the lock-out feature of this relay, it cannot return contacts 23', 23 and 23c to their original positions. This can only be done manually after the ground fault has been detected and cleared.

The ground fault $F_2$ in line 12 would now manifest itself by showing a voltage drop to zero on voltmeter 29.

A ground fault appearing at $F_3$ in line 13 is detected in a manner similar to a ground fault in line 12. In this connection, there would be an initial current flow through the coil of milliameter 16 and normally closed contacts 23', the direction of the current being the same as it was in the event of a fault in line 12. Accordingly, contacts 16b close and momentarily energize lock-out relay 23. In turn, normally closed contacts 23' and 23c will open and normally open contacts 23 close. A voltage drop toward zero, appearing on voltmeter 30, indicates that the fault is in line 13.

It will also be apparent that a fault $F_2$ or $F_3$ also triggers the alarm circuit since momentary energizing of lock-out relay coil 23 opens contacts 23c, thereby deenergizing alarm relay 24 and closing contacts 24b and 24c.

Although a preferred embodiment of this invention has been illustrated and described, various modifications and changes may be resorted to without departing from the spirit of the invention or the scope of the attached claims, and each of such modifications and changes is contemplated.

What is claimed is:

1. A ground fault detection circuit for a dual voltage battery system having first, second and third lines, one line connected to a common bus and the other two lines connected to the positive and negative sides of said battery system, said circuit comprising:
    a first ground connected circuit including a set of normally closed contacts;
    a second ground connected circuit including a set of normally open contacts;
    means responsive to a momentary current flow through said first circuit for opening said normally closed contacts, interrupting the current flow therethrough, and closing the normally open contacts of said second circuit, allowing current to flow therethrough;
    means interconnecting said first and second lines and connecting both lines to ground through said first circuit and its normally closed contacts;
    means interconnecting said second and third lines and connecting both lines to ground through said second circuit and its normally open contacts; and
    a plurality of means for indicating voltage drops between ground and said first, second and third lines, respectively, one means indicating a voltage drop through the normally closed contacts of said first circuit between ground and said first line, a second means indicating a voltage drop through the normally open contacts of said second circuit between ground and said second line, and a third means indicating a voltage drop through the normally open contacts of said second circuit between ground and said third line.

2. The ground fault detection circuit of claim 1 and further comprising an alarm circuit including a set of normally open contacts, a holding circuit including a relay which when energized closes said normally open contacts, and means for deenergizing said holding circuit when current flows through said first circuit.

3. The ground fault detection circuit of claim 1, said means for indicating voltage drops comprising a first voltmeter connected across a first resistance between said first line and the normally closed contacts of said first ground connected circuit, a second voltmeter connected across a second resistance between said second line and the normally open contacts of said second ground connected circuit, and a third voltmeter connected across a third resistance between said third line and the normally open contacts of said second ground connected circuit.

4. The ground fault detection circuit of claim 1, said first and second lines being connected to ground through resistances of substantially equal values and through said normally closed contacts of said first ground connected circuit; said second and third lines being connected to ground through resistances of substantially equal value and said normally open contacts of said second ground connected circuit.

5. The ground fault detection circuit of claim 1, and further including an alarm circuit comprising an alarm relay having a coil connected in series with its normally open contacts and a set of normally closed contacts, means including normally open contacts responsive to a flow of current in said first ground connected circuit for shorting out the coil of said alarm relay, whereby either a positive or negative flow of current causes said alarm relay to be deenergized and signals an alarm.

6. A ground fault detection circuit for a dual voltage battery system having first, second and third lines, one line connected to a common bus and the other two lines connected to the positive and negative sides of said battery system, said circuit comprising:
    a milliameter relay having a coil and a set of normally open contacts which are closed by a current flow through the coil;
    a lock-out relay having a coil, a normally closed set of contacts and a normally open set of contacts;
    means interconnecting said first and second lines and connecting both lines to ground through the coil of said milliameter relay and the normally closed contacts of said lock-out relay;
    means for momentarily energizing said lock-out relay through the contacts of said milliameter relay;
    means interconnecting said second and third lines and connecting both lines to ground through the normally open contacts of said lock-out relay; and a plurality of means for indicating voltage drops between ground and said first, second and third lines, respectively, one means indicating a voltage drop through the normally closed contacts of said lock-out relay between ground and said first line, and a second means indicating a voltage drop through the normally open contacts of said lock-out relay between ground and said second line, and a third means indicating a voltage drop through the normally open contacts of said lock-out relay between ground and said third line.

7. The ground fault detection circuit of claim 6 and further comprising an alarm circuit including a set of normally open contacts, a holding circuit including a relay which when energized closes said normally open contacts, and means for deenergizing said holding circuit when current flows through the coil of said milliameter relay.

8. The ground fault detection circuit of claim 6, said means for indicating voltage drops comprising a first voltmeter connected across a first resistance and the coil of said milliameter, a second voltmeter connected across a second resistance and between said second line and said normally open contacts of said lock-out relay, and a third voltmeter connected across a third resistance between the third line and the normally open contacts of said lock-out relay.

9. The ground fault detection circuit of claim 6, said first and second lines being connected to ground through resistances of substantially equal values, through the coil of said milliameter relay and through said normally closed contacts of said lock-out relay; said second and third lines being connected to ground through resistances of substantially equal value and said normally open contacts of said lock-out relay.

10. The ground fault detection circuit of claim 6, and further including an alarm circuit comprising an alarm relay having a coil connected in series with its normally open contacts and a set of normally closed contacts of said lock-out relay, means including normally open contacts operated by said milliameter relay for shorting out the coil of said alarm relay, whereby either a positive or negative flow of current through the coil of said milliameter causes said alarm relay to be deenergized and signals an alarm.

* * * * *

UNITED STATES PATENT OFFICE
CERTIFICATE OF CORRECTION

Patent No. 3,696,367      Dated    October 3, 1972

Inventor(s)    Sayed-Ibrahim S. Inamdar

It is certified that error appears in the above-identified patent and that said Letters Patent are hereby corrected as shown below:

Column 1, line 60, "is" should read -- in -- . Column 2, lines 11, 16, 29, 54, and 57 and column 3, lines 17, 21 and 36, "23" should read -- 23" -- .

Signed and sealed this 20th day of March 1973.

(SEAL)
Attest:

EDWARD M. FLETCHER, JR.          ROBERT GOTTSCHALK
Attesting Officer                Commissioner of Patents